(12) United States Patent
Smith et al.

(10) Patent No.: US 6,763,292 B1
(45) Date of Patent: Jul. 13, 2004

(54) PREDICTION AND COMPENSATION FOR LAND VEHICLE DYNAMICS BASED ON FEEDFORWARD ROAD CONDITIONS

(75) Inventors: Gordon James Smith, Rochester, MN (US); George Willard Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/598,815

(22) Filed: Jun. 21, 2000

(51) Int. Cl.[7] .............................................. B60G 23/00
(52) U.S. Cl. .............................. 701/37; 701/1; 701/23; 701/27
(58) Field of Search ................................. 701/1, 23, 27, 701/28, 37, 40, 41, 44, 70, 93, 96, 98, 116, 117, 225, 36; 382/4

(56) References Cited

U.S. PATENT DOCUMENTS

| | | | |
|---|---|---|---|
| 5,432,509 A | * 7/1995 | Kajiwara | 340/903 |
| 5,546,308 A | 8/1996 | Yamamoto | 701/93 |
| 5,983,161 A | * 11/1999 | Lemelson et al. | 701/301 |
| 6,121,896 A | * 9/2000 | Rahman | 340/902 |
| 6,161,071 A | * 12/2000 | Shuman | 701/48 |
| 6,169,940 B1 | * 1/2001 | Jitsukata et al. | 701/23 |
| 6,185,496 B1 | * 2/2001 | Matsuno | 701/70 |
| 6,202,020 B1 | * 3/2001 | Kyrtos | 701/80 |
| 6,225,918 B1 | * 5/2001 | Kam | 340/903 |
| 6,226,389 B1 | * 5/2001 | Lemelson et al. | 382/104 |
| 6,275,773 B1 | * 8/2001 | Lemelson et al. | 701/301 |
| 6,278,928 B1 | * 8/2001 | Aruga et al. | 701/65 |

* cited by examiner

*Primary Examiner*—Marthe Y. Marc-Coleman
(74) *Attorney, Agent, or Firm*—Roy W. Truelson

(57) ABSTRACT

A method for producing a response to driving conditions ahead of a land vehicle such as an automobile includes a second vehicle using information received from a first vehicle traveling ahead of it to adjust vehicle mechanisms such as the suspension to cancel adverse effects of road anomalies sensed by the first vehicle.

24 Claims, 4 Drawing Sheets

PREDICTION AND COMPENSATION FOR LAND VEHICLE DYNAMICS BASED ON FEEDFORWARD ROAD CONDITIONS

BACKGROUND OF THE INVENTION

1. Field of the Invention

The present invention relates generally to automobiles and similar vehicles and, more specifically, to dynamic adjustment of automotive vehicle drive systems based upon road conditions.

2. Description of the Related Art

Automobiles experience a variety of road conditions that affect the handling of the automobile. For example, snow and ice impair traction. Potholes or bumps can impair steering control and cause discomfort to the occupants of the automobile.

Systems have been developed that dynamically adjust automobile driving parameters, such as suspension, braking and throttle, in response to sensed conditions. One well-known system of this type is the anti-lock braking system (ABS) common in newer automobiles. The sensed conditions may be those internal to automobile drive systems, such as the braking system in the case of ABS, or those of external parameters such as ambient air pressure. Another example of the former type of system is described in U.S. Pat. No. 5,546,308, issued to Yamamoto. In that system, the throttle is adjusted in response to the sensed state of a tire pressure sensor, a running distance sensor, an acceleration sensor, a wheel speed sensor and a brake sensor. The system responds to these sensed parameters by preventing the vehicle speed from increasing when the sensed parameters indicate that the road-holding ability of the vehicle is impaired.

The types of systems described above are often of limited effectiveness because the road conditions that caused the impairment are transient. The vehicle may have already passed the affecting section of road by the time the system can adjust the relevant drive system parameters in response. It would be desirable to provide a system that adjusts vehicle drive system parameters in response to sensed road conditions sufficiently in advance of the vehicle reaching the affecting section of road that the adjustment has the intended beneficial effect. The present invention addresses these problems and deficiencies and others in the manner described below.

SUMMARY OF THE INVENTION

The present invention relates to a method and system for producing a response to driving conditions ahead of a land vehicle such as an automobile. The driving conditions are sensed by another vehicle (the "first" vehicle) ahead of the vehicle in which the response is produced (the "second" vehicle). Any suitable driving condition can be sensed, including parameters of internal vehicle mechanism dynamics such as movement of the vehicle suspension, and parameters external to the vehicle such as road features and obstacles sensed by radar, ultrasonic, optical or similar sensors. The first vehicle transmits the sensed driving condition information to the second vehicle. The response produced by the second vehicle can be any suitable electronically controlled response, including adjusting a drive system mechanism such as the vehicle's suspension, braking, cruise control or throttle mechanisms, and including providing an indication perceptible by the driver or other occupant, such as activating a warning light or sounding a buzzer. The response can be designed to counteract or cancel the negative effects of the driving condition. For example, if the suspension of the first automobile moves in a manner that indicates one or more of its wheels have dipped into a pothole, when the second vehicle reaches the pothole it can actuate its suspension to lower the corresponding wheels to conform to the depth of the pothole and thus provide a smoother ride for the occupants.

The second vehicle can identify the first vehicle by any suitable means, such as obtaining geographic location information from global positioning satellite receivers in the vehicles and comparing them to determine whether there is a vehicle ahead that can provide the requisite driving condition information. Alternatively, if the first and second vehicles are physically or electronically linked to one another, such as in the automobile trains that have been suggested in the art, the identities of vehicles that are ahead of other vehicles can readily be identified because they are predetermined or fixed during operation of the system. Such vehicle trains have been suggested in which a number of automobiles travel at highway speeds and have automated systems that respond to radar sensors to maintain separation between the automobiles.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
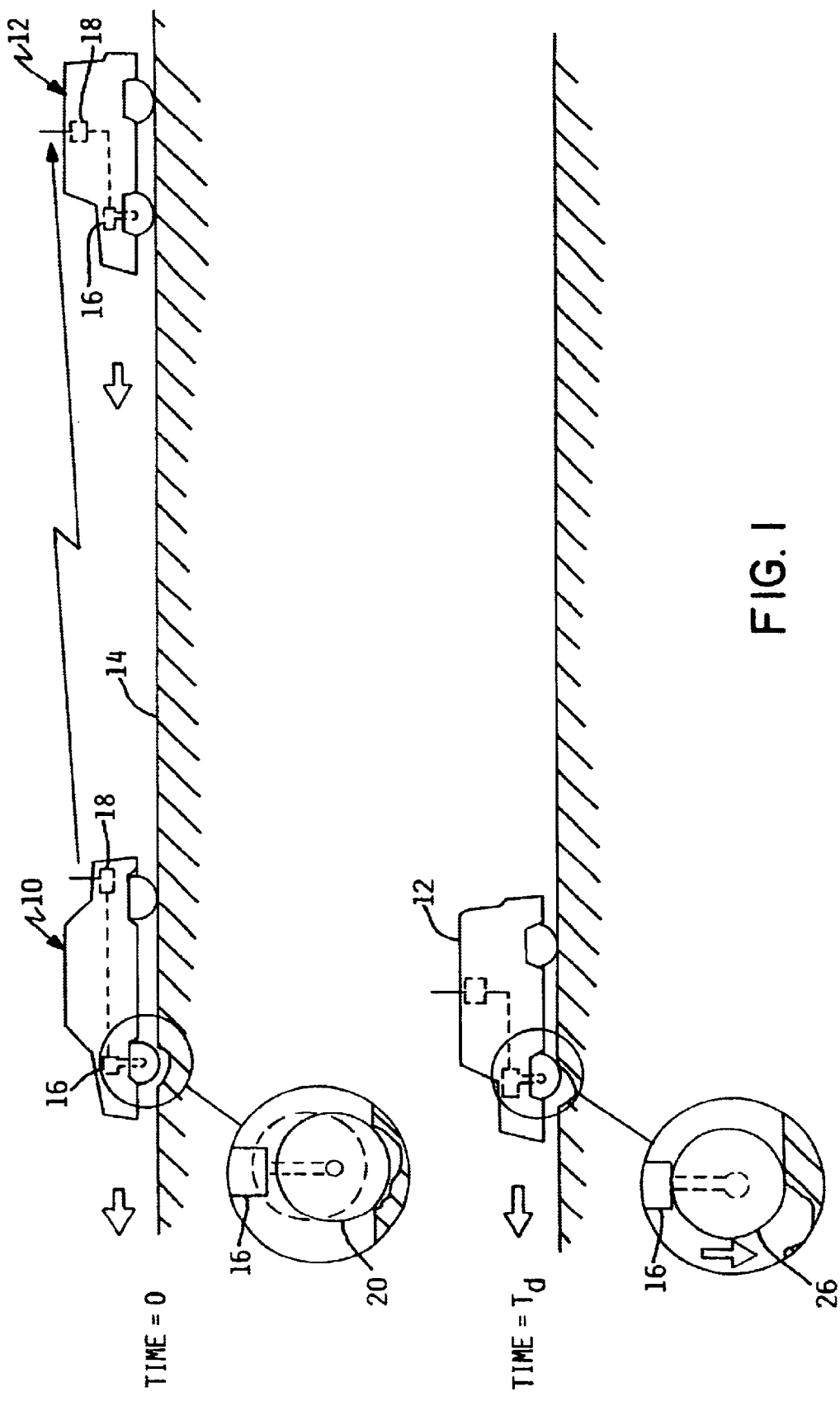
FIG. 1 illustrates a system in which a vehicle receives road condition information sensed by a vehicle ahead of it and adjusts parameters of its drive system in response to that information.

As illustrated in the upper half of FIG. 1, at time T=0, a first automobile 10 is driving ahead of a second automobile 12 along a road 14. Automobiles 10 and 12 each have a system for producing a response to road conditions or anomalies ahead of them. In this embodiment of the invention, the response includes both adjusting the automobile's suspension and alerting the driver of the existence of the road condition. The system includes a controlled suspension system 16 and controller electronics 18. As indicated in the enlargement, showing one of the wheels 20 and its associated controlled suspension system 16 of automobile 10, when wheel 20 rolls over a pothole or similar depression in road 14, controlled suspension system 16 allows it to travel downwardly into the depression with respect to the remainder of automobile 10. As well-understood in the art to which the invention pertains, this action of an automobile suspension smoothes the ride from the perspective of an occupant of automobile 10.

Controller electronics 18 of vehicle 10 and controller electronics of vehicle 12 can communicate with one another.

Figure 3:
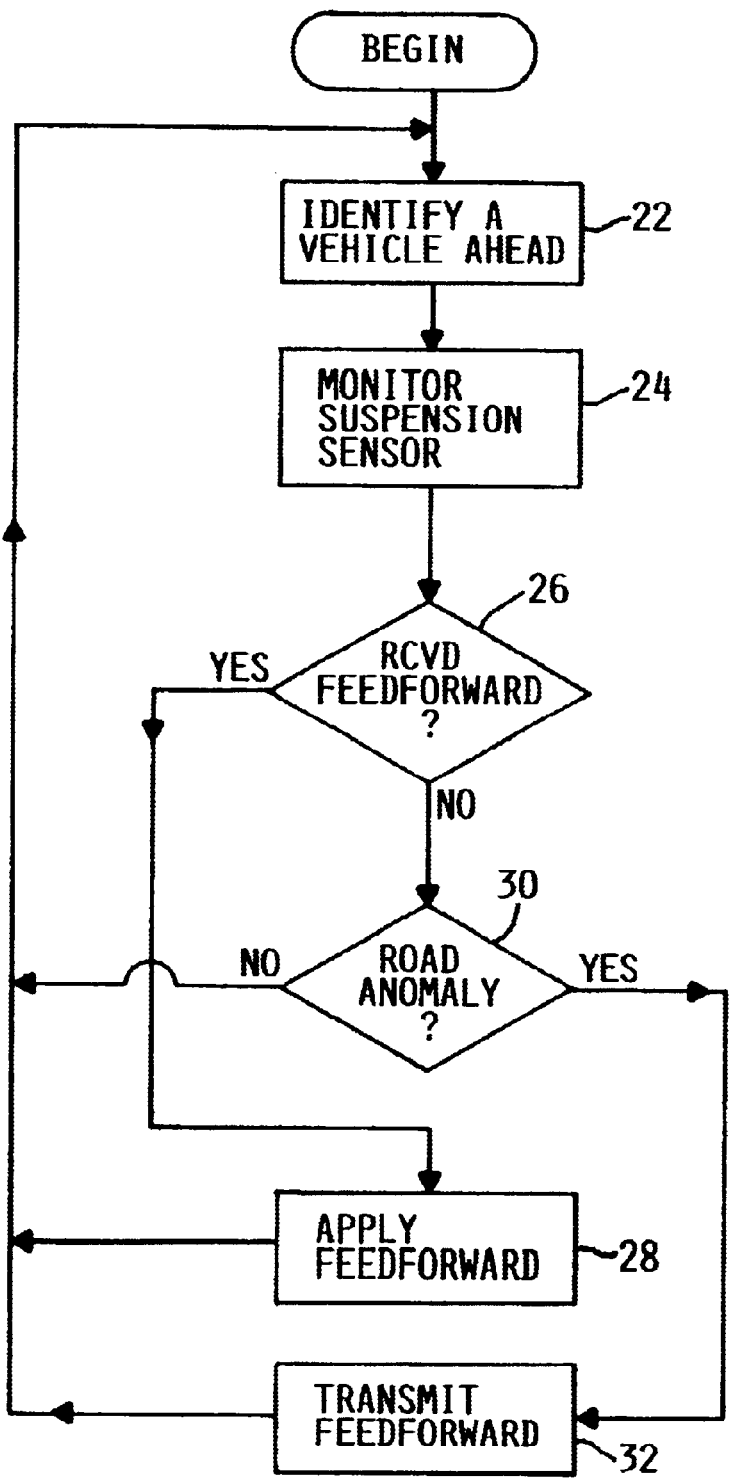
FIG. 3 is a flow chart illustrating the steps of the method that occurs in operation of the system.

As illustrated by step 22 of the flowchart of FIG. 3, controller electronics 18 of vehicle 12 must first must identify vehicle 10 as driving ahead of it, i.e., along the same relatively straight path, and as having controller electronics 18 capable of communicating with it. To do so, in this embodiment of the invention controller electronics 18 of automobile 10 can transmit a pilot signal that controller electronics 18 of automobile 12 can receive. An identification number can be encoded in the pilot signal. In response to receiving the pilot signal, controller electronics 18 of automobile 12 can interrogate controller electronics 18 of automobile 10 to determine the geographic location of automobile 10. Controller electronics 18 of automobile 12 can then compare the location of automobile 10 with the location of vehicle 12 to determine whether automobile 10 is traveling ahead of automobile 10 along substantially the same path. The paths of automobiles 10 and 12 can be computed by plotting their courses or headings from two or more successive readings of their locations. Controller electronics 18 of automobile 12 identifies controller electronics 18 of automobile 10 in this manner for purposes of further communication between them, as described below.

At step 24 controller electronics monitors its controlled suspension system 16 for vertical movement of wheel 20 (FIG. 1). When such movement is detected, controller electronics 18 of automobile 10 transmits a feedforward signal quantifying the movement. Thus, in this example, as wheel 20 moves downwardly into the depression, controller electronics 18 of automobile 10 transmits information quantifying downward travel of wheel 20. At step 26, automobile 12 can receive this information. Having identified automobile 10 as traveling ahead of it along the same or substantially the same path at step 22, automobile 12 uses the information at step 28 to adjust its controlled suspension system 16. Note with regard to the lower half of FIG. 1 that if automobile 12 is traveling behind automobile 10 along substantially the same path, the corresponding wheel 26 of automobile 12 will roll into the same depression in road 14 at time $T=T_d$ as did wheel 20 of automobile 10 at time T=0. An exemplary algorithm for computing this time delay, $T_d$, is described below in further detail. Using the received feedforward information quantifying the downward travel of wheel 20, controller electronics 18 of automobile 12 can cause controlled suspension system 16 of automobile 12 to adjust its suspension to compensate. In other words, controlled suspension system 16 of automobile 12 can actively lower wheel 26 into the depression by the same amount of vertical travel as wheel 20 experienced. Controlled suspension system 16 can likewise compensate for vertical road anomalies other than depressions, such as bumps.

Note that in the illustrated embodiment of the invention each of automobiles 10 and 12 is capable both of transmitting detected road anomaly information to aid vehicles behind it and of being aided by such information that it receives from a vehicle ahead of it. Thus, the method or process performed by each of automobiles 10 and 12, as well as any other vehicles equipped in accordance with the present invention, is generally described by steps 22, 24, 26, 28, 30 and 32. With respect to the above-described example, at step 30, controller electronics 16 of automobile 10 determines whether the depression has been detected and, at step 32, transmits the feedforward information as described above. Note that in other embodiments of the invention, not every vehicle need be capable of both transmitting detected road anomaly information to aid vehicles behind it and of being aided by such information that it receives from a vehicle ahead of it. In a system of two vehicles, for example, one of them may be capable of detecting and transmitting road anomaly information but not of receiving and using such information, while the other may be capable only of receiving and using the information but not of detecting and transmitting such information. Along the same lines, note that not all vehicles need have the same sensors or the same control mechanisms; some vehicles may have, for example, a subset of the sensors and control mechanisms that others have.

Although in the illustrated embodiment of the invention, controlled suspension system 16 compensates for vertical travel of the suspension, in other embodiments other types of controlled mechanisms can compensate for detected movements of other vehicle mechanisms. For example, a suitable sensing system in the vehicle ahead can detect wheel slippage, e.g., loss of traction due to a patch of ice, and transmit this information to the vehicle or vehicles behind it. The controller electronics in the vehicles behind can receive and use this information to cause suitable actuators or other mechanisms to adjust the brakes to compensate for the anticipated loss of traction in a manner similar to anti-lock braking systems. In other embodiments of the invention, the sensors and actuators can relate to stopping or slowing for obstacles in the road or steering to avoid them. For example, a suitable sensing system in the vehicle ahead can detect an obstacle in the road and transmit this information to the vehicle or vehicles behind it. The controller electronics in the vehicles behind can use this information to prevent the drivers from accelerating or to automatically slow or stop the vehicles.

In addition or alternatively to transmitting information describing road anomalies or other driving conditions from one vehicle to another, in other embodiments of the invention a base station at a fixed geographic location can receive the information and relay it to other vehicles in the vicinity of the anomaly. Similarly, a vehicle can relay information that it receives.

Figure 2:
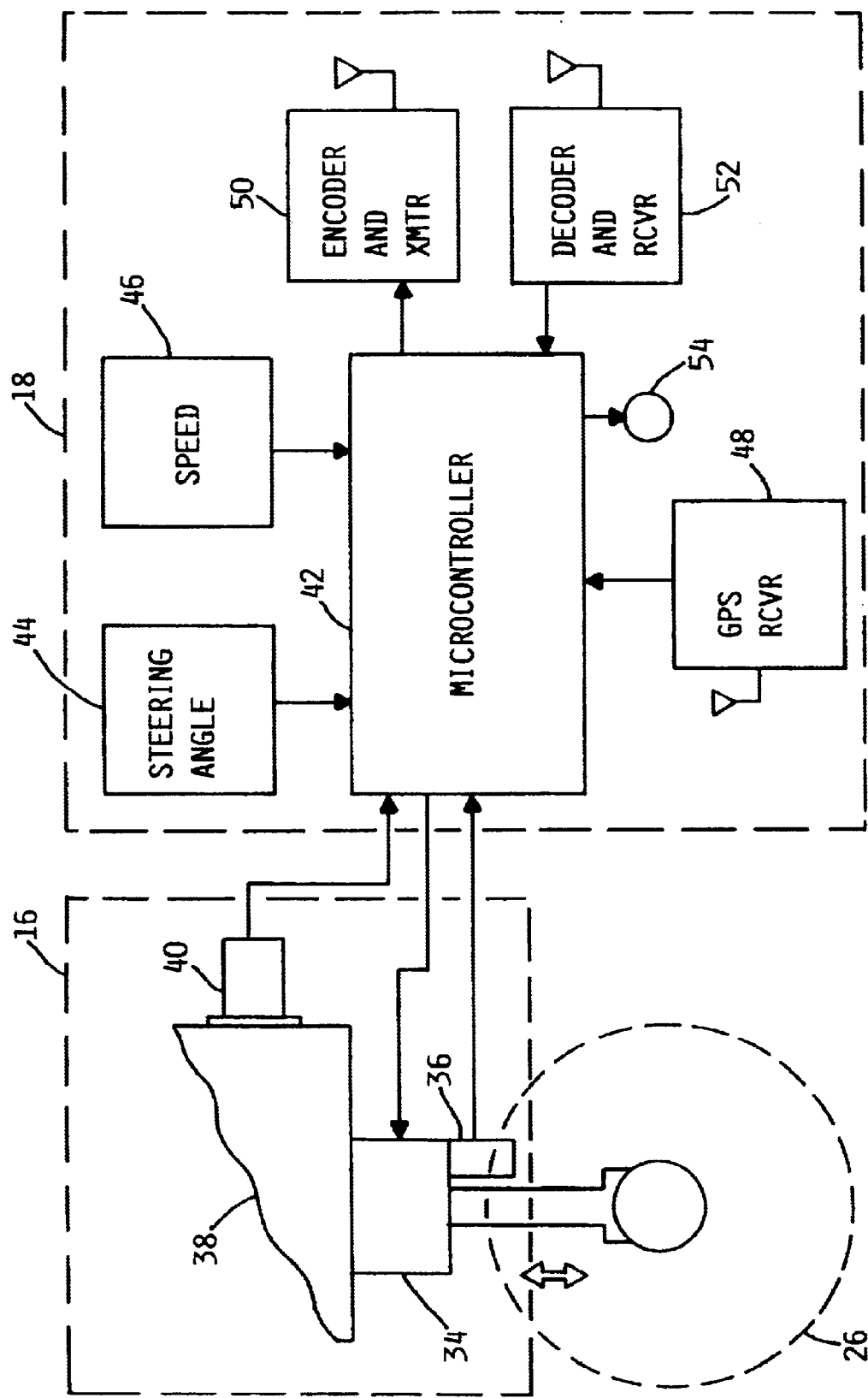
FIG. 2 is a schematic block diagram of the system.

As illustrated in FIG. 2, controlled suspension system 16 includes an actuator 34 that moves the suspension vertically, a sensor 36 such as a displacement transducer that senses vertical travel of the suspension with respect to the vehicle body 38, and a sensor 40 such as a vertically sensitive accelerometer mounted to body 38. Controller electronics 18 includes a microcontroller 42 or similar device capable of performing computations such as those described herein, a vehicle steering angle sensor 44, a vehicle speed sensor 46, a global positioning satellite (GPS) receiver 48, an encoder and transmitter 50, and a decoder and receiver 52. Microcontroller 42 can determine the movement of the suspension relative to body 38 by comparing the measurements produced by sensors 36 and 40. Microcontroller 42 can use GPS receiver 48 to determine the geographic location of the vehicle. Microcontroller 42 can use the measured steering angle along with the GPS coordinates to determine the course or heading of the vehicle. Microcontroller 42 causes encoder and transmitter 50 to transmit the identifying information, location information and suspension movement information as described above. Similarly, microcontroller 42 uses decoder and receiver 52 to receive such information transmitted from other vehicles. In addition to adjusting the suspension to respond to the road anomaly or other sensed driving condition, microcontroller 42 alerts the driver of automobile 12 of the existence of the anomaly by causing a dashboard-mounted indicator lamp 54 to illuminate. Preferably, lamp 54 illuminates before automobile 12 reaches the location of the anomaly so that the driver can choose to respond in another manner, such as by braking or steering. Persons of ordinary skill in the art are readily capable of programming microcontroller 42 to perform these functions.

Note that although the operation of the system is described above for purposes of illustration with respect to a single, well-defined anomaly such as a pothole or other depression in road 14, the system operates continuously in a pipelined fashion. In other words, information describing how the suspension of automobile 10 responds to the shape of road 14 at every point is transmitted and used to adjust the suspension of automobile 12. Thus, for example, the system can compensate for the adverse effects of long undulations in road 14 in addition to merely a single pothole or a single bump.

Figure 4:
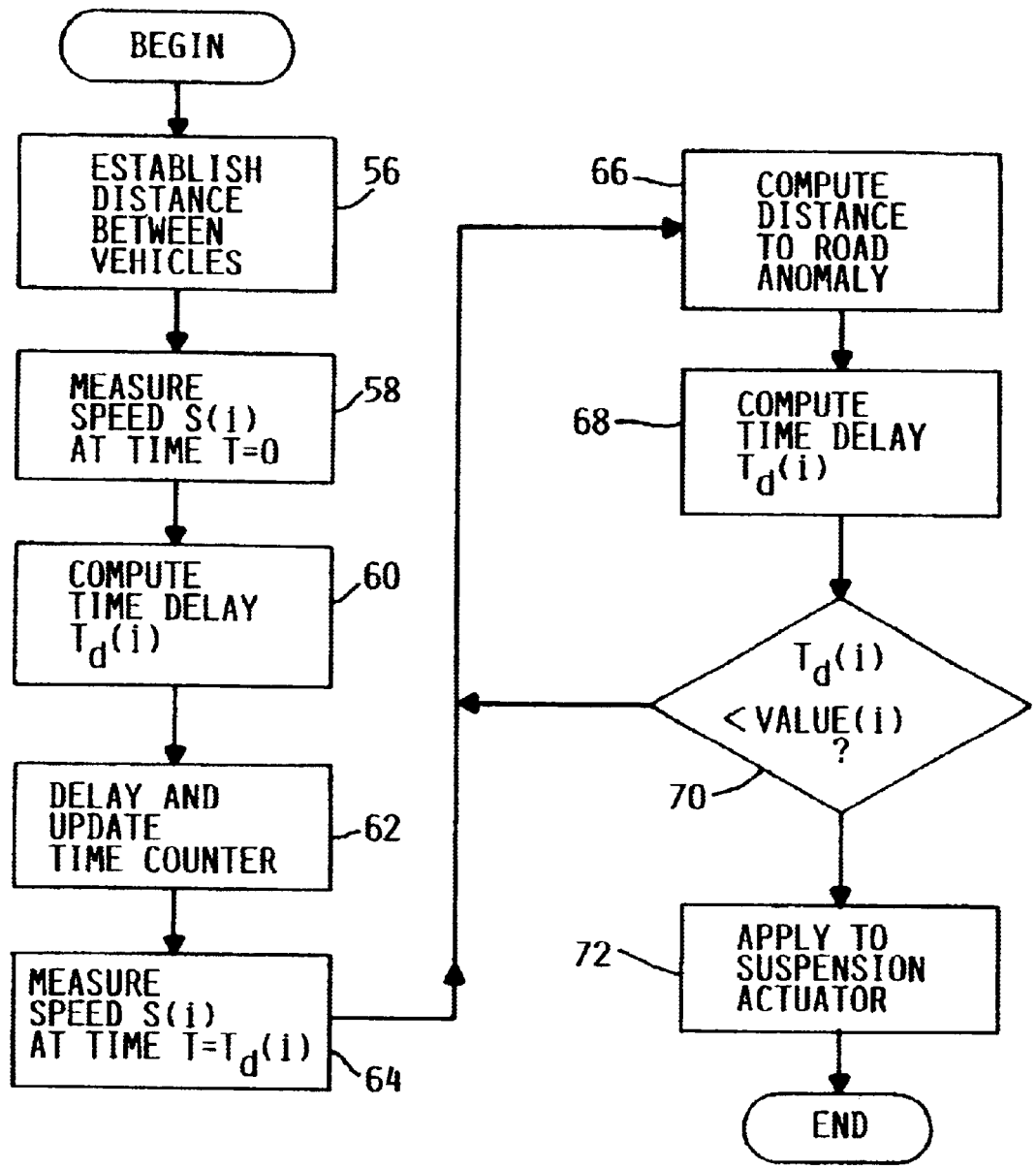
FIG. 4 is a flow chart illustrating in further detail the step of applying feedforward from FIG. 3.

FIG. 4 illustrates step 28 of the method (FIG. 3) in further detail, including an exemplary method for determining the time delay, $T_d(i)$ between automobiles 10 and 12. Note that although the method is described in terms of a system consisting of two vehicles for purposes of clarity, the method is applicable to a system of any number (N) of vehicles. The same method steps can be performed with respect to each vehicle ("vehicle(i)", where i is an integer from one to N) in the system. Although the variable i is shown below to emphasize that the method is applicable to a system of any number of vehicles, note that in this example i=1 for automobile 10 and i=2 for automobile 12. Generally speaking, microcontroller 42 of automobile 12 computes $T_d(i)$ and then waits $T_d(i)$ seconds after receiving the driving condition information before causing actuator 34 to move in response. As described above, this allows automobile 12 to reach the point in road 14 at which automobile 10 sensed the anomaly. The time delay can be described by the equation $T_d(i)=M(i)/S(i)$ where M(i) in this example is the lineal distance between a given axle on automobile 12 and the location on road 14 sensed by automobile 10 as having an anomaly. At step 56 microcontroller 42 establishes the initial distance, $M_0$, at time T=0 between automobiles 10 and 12 by receiving the geographic coordinates from automobile 10 as reported by GPS and comparing them to its own geographic coordinates as reported by GPS. Alternatively, in other embodiments of the invention the distance between vehicles can be determined by other suitable means such as radar ranging. (Generally speaking, the distance is established between vehicle(i) and each of the other N-1 vehicles.) At step 58 microcontroller 42 measures the speed S(i) of automobile 12 at time T=0 by reading speed sensor 46. At step 60 microcontroller 42 computes $T_d(i)$ by dividing M(i) by S(i). At step 62 microcontroller then allows some time interval Δt to elapse at step 62. This interval can be very short, e.g., 0.001 seconds. Microcontroller 42 can maintain the time t using a suitable counter that increments itself by Δt. At step 64 microcontroller 42 then again measures the speed S(i) of automobile 12 at time T=t by reading speed sensor 46. At step 66 microcontroller 42 computes the new or updated lineal distance M(i) to the road anomaly using the equation M(i)=M(i)−S(i)*Δt. At step 68 microcontroller computes the new or updated time delay $T_d(i)$ remaining until automobile 12 reaches the road anomaly using the equation $T_d(i)=M(i)/S(i)$. At step 70 microcontroller 42 determines whether $T_d(i)$ is less than some predetermined value that is indicative of automobile 12 having essentially reached the road anomaly. If this comparison indicates that automobile 12 has reached the road anomaly, then at step 72 microcontroller 42 moves actuator 34 in response to the received information as described above. If automobile 12 has not yet reached the road anomaly, microcontroller 42 returns to step 66 to continue processing.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for producing a response to road conditions ahead of a vehicle, comprising the steps of:
    identifying a first vehicle ahead of a second vehicle traveling along the same path;
    electronically sensing non-vehicular driving condition information local to said first vehicle, said step of electronically sensing non-vehicular driving condition information being performed automatically by electronic apparatus within said first vehicle;
    transmitting said non-vehicular driving condition information from said first vehicle to said second vehicle;
    producing a response to said non-vehicular driving condition information in said second vehicle, said step of producing a response to said driving condition information being performed automatically by electronic apparatus within said second vehicle.

2. The method claimed in claim 1, wherein said step of producing a response to said non-vehicular driving condition information in said second vehicle comprises the step of producing an alert indication in said second vehicle perceptible by an occupant of said second vehicle.

3. The method claimed in claim 1, wherein said step of producing a response to said non-vehicular driving condition information in said second vehicle comprises the step of adjusting a suspension mechanism of said second vehicle.

4. The method claimed in claim 1, wherein said identifying step comprises the steps of:
    electronically sensing a location of said first vehicle;
    electronically sensing a location of said second vehicle; and
    comparing said locations of said first and second vehicles to each other.

5. The method claimed in claim 4, wherein:
    said step of electronically sensing a location of said first vehicle comprises the step of obtaining geographic location information from a global positioning satellite receiver in said first vehicle; and
    said step of electronically sensing a location of said second vehicle comprises the step of obtaining geographic location information from a global positioning satellite receiver in said second vehicle.

6. The method claimed in claim 1, wherein said step of electronically sensing non-vehicular driving condition information comprises the step of obtaining information from a drive system mechanism of said first vehicle.

7. The method claimed in claim 6, wherein said step of obtaining information from a drive system mechanism of said first vehicle comprises the step of obtaining information from a suspension mechanism of said first vehicle.

8. The method claimed in claim 7, wherein said step of producing a response to said non-vehicular driving condition information in said second vehicle comprises the step of adjusting a suspension mechanism of said second vehicle.

9. The method claimed in claim 7, wherein said step of producing a response to said non-vehicular driving condition information in said second vehicle comprises the step of producing an alert indication in said second vehicle perceptible by an occupant of said second vehicle.

10. A system for producing a response to road conditions ahead of a vehicle, comprising:

a means for identifying a first vehicle ahead of a second vehicle traveling along the same path;

a sensor in said first vehicle providing non-vehicular driving condition information local to said first vehicle;

a transmitter in said first vehicle transmitting said non-vehicular driving condition information;

a receiver in said second vehicle receiving said non-vehicular driving condition information from said first vehicle; and a means for producing a response to said non-vehicular driving condition information in said second vehicle.

11. The system claimed in claim 10, wherein said means for producing a response to said non-vehicular driving condition information in said second vehicle comprises an indicator producing an alert indication in said second vehicle perceptible by an occupant of said second vehicle.

12. The system claimed in claim 10, wherein said means for producing a response to said non-vehicular driving condition information in said second vehicle is a suspension adjustment actuator.

13. The system claimed in claim 10, wherein said means for identifying a first vehicle ahead of a second vehicle comprises:

an electronic location sensor in said first vehicle;

an electronic location sensor in said second vehicle; and electronic logic for comparing said locations of said first and second vehicles to each other.

14. The system claimed in claim 13, wherein:

said electronic location sensor in said first vehicle is a global positioning satellite receiver; and said electronic location sensor in said second vehicle is a global positioning satellite receiver.

15. The system claimed in claim 10, wherein said sensor in said first vehicle is a drive system mechanism sensor.

16. The system claimed in claim 15, wherein said drive system mechanism sensor is a suspension mechanism sensor.

17. The system claimed in claim 16, wherein said means for producing a response to said non-vehicular driving condition information in said second vehicle is a suspension adjustment actuator.

18. The system claimed in claim 16, wherein said means for producing a response to said non-vehicular driving condition information in said second vehicle comprises an indicator producing an alert indication in said second vehicle perceptible by an occupant of said second vehicle.

19. A land vehicle for operation on public roads, comprising:

a receiver for receiving first driving condition information transmitted by a leading vehicle, said first driving condition information comprising information regarding a non-vehicular driving condition local to said leading vehicle, said first driving condition information being sensed by said leading vehicle;

a leading vehicle verification mechanism which verifies that said first driving condition information received by said receiver was transmitted by a vehicle traveling ahead of said land vehicle on the same path; and an automated response mechanism which produces an automated response to said first driving condition information if said leading vehicle verification mechanism verifies that said first driving condition information was transmitted by a vehicle traveling ahead of said land vehicle on the same path.

20. The land vehicle of claim 19, further comprising:

at least one sensor for sensing second driving condition information; and a transmitter for transmitting said second driving condition information to at least one vehicle traveling behind said land vehicle on the same path.

21. The land vehicle of claim 19, wherein said automated response mechanism produces an alert indication in said land vehicle perceptible by an occupant of said land vehicle.

22. The land vehicle of claim 19, wherein said automated response mechanism automatically adjusts a suspension mechanism of said land vehicle.

23. The land vehicle of claim 19, wherein said leading vehicle verification mechanism comprises:

a global positioning satellite receiver receiving first geographic location information, said first geographic location information relating to location of said land vehicle;

controller electronics which compares said first geographic location information with second geographic location information received from said leading vehicle, said second geographic location information relating to location of said leading vehicle.

24. The land vehicle of claim 19, wherein said first driving condition information comprises information regarding a road anomaly.

* * * * *